United States Patent [19]

Kawazura et al.

[11] Patent Number: 6,020,068
[45] Date of Patent: Feb. 1, 2000

[54] PROCESS FOR THE PRODUCTION OF SURFACE-TREATED CARBON BLACK FOR THE REINFORCEMENT OF RUBBERS

[75] Inventors: Tetsuji Kawazura; Kazunori Ishikawa, both of Hiratsuka, Japan

[73] Assignee: The Yokohama Rubber Co., Ltd., Tokyo, Japan

[21] Appl. No.: 09/043,729

[22] PCT Filed: Jun. 4, 1997

[86] PCT No.: PCT/JP97/01901

§ 371 Date: Mar. 26, 1998

§ 102(e) Date: Mar. 26, 1998

[87] PCT Pub. No.: WO98/06787

PCT Pub. Date: Feb. 19, 1998

[30] Foreign Application Priority Data

Aug. 12, 1996 [JP] Japan ................................. 8-212768

[51] Int. Cl.⁷ .............................. C09L 3/12; C09L 1/56; B32B 5/16
[52] U.S. Cl. .......................... 428/405; 428/403; 106/476
[58] Field of Search .............................. 106/476, 287.16; 428/403, 405

[56] References Cited

U.S. PATENT DOCUMENTS

| | | | |
|---|---|---|---|
| 3,290,165 | 12/1966 | Iannicelli | 106/475 |
| 4,670,059 | 6/1987 | Hackleman et al. | 106/475 |
| 4,882,225 | 11/1989 | Fukui et al. | 428/405 |
| 5,387,467 | 2/1995 | Hohner et al. | 428/391 |
| 5,489,328 | 2/1996 | Ono et al. | 106/2 |
| 5,502,146 | 3/1996 | Inoue et al. | 528/34 |

FOREIGN PATENT DOCUMENTS

| | | |
|---|---|---|
| 0 468 140 A2 | 1/1992 | European Pat. Off. . |
| 0 896 987 A1 | 2/1999 | European Pat. Off. . |
| 1-126375 | 5/1989 | Japan . |
| 1-182368 | 7/1989 | Japan . |
| 1-284564 | 11/1989 | Japan . |
| 4-190839 | 7/1992 | Japan . |
| 9-118780 | 5/1997 | Japan . |
| 9-118781 | 5/1997 | Japan . |

OTHER PUBLICATIONS

Chemical Abstracts vol. 107, No. 12, Abstract No. 107:99209, Sep. 21, 1987, Abstract of JP 61291659 A (Dec. 22, 1986).

Chemical Abstracts vol. 90, No. 8, Abstract No. 90:57293, Feb. 19, 1979, Abstract of JP53100190A (Sep. 1, 1978).

Derwent Abstracts, vol. 91, Abstract No. 91–112884, Abstract of JP3053260A (Mar. 7, 1991).

*Primary Examiner*—David Brunsman
*Attorney, Agent, or Firm*—Nikaido Marmelstein Murray & Oram, LLP

[57] ABSTRACT

A process for producing surface-treated carbon black for rubber reinforcement characterized by providing carbon black and organosiloxane together; and then heating the mixture to a temperature of 60° C. to 200° C. to deposit a silicon dioxide residue on the surface of the carbon black and a rubber composition using the same.

7 Claims, No Drawings

PROCESS FOR THE PRODUCTION OF SURFACE-TREATED CARBON BLACK FOR THE REINFORCEMENT OF RUBBERS

TECHNICAL FIELD

The present invention relates to a process for producing carbon black treated on the surface thereof with silica. More specifically, it relates to carbon black for tires and other various types of rubber products having the superior tan δ temperature dependence possessed by silica and improved wear resistance and electrical conductivity and to a rubber composition containing the same.

BACKGROUND ART

Reinforcing fillers such as carbon black, silica have been conventionally used for reinforcing rubber. Silica, as compared with carbon black, has properties of a low tan δ at high temperatures (around to 60° C.) and a high tan δ at low temperatures (around to 0° C.), and therefore, when used for rubber compositions for tire treads, a tire having a low rolling resistance and a high gripping power can be advantageous produced. However, silica, is inferior to carbon black in wear resistance and has a low electrical conductivity, and therefore, if silica is used for tires, there is the problem that the tire will pick up a charge when driven on and will cause various problems. These and other problems have not been solved yet.

On the other hand, it has been proposed in, for if example Japanese Examined Patent Publication (Kokoku) No. 50-14254 and Japanese Examined Patent Publication (Kokoku) No. 7-30269 that, by coating the surface of a pigment etc. with, for example, silica the surface charge thereof is changed whereby the dispersibility is improved and the weather resistance is increased. For example, Japanese Examined Patent Publication (Kokoku) No. 7-30269 discloses a method for treating the surface of carbon black for a powder coating composition comprised of dispersing carbon black in water, adjusting the pH thereof to 6 or more, and, while maintaining the temperature of 70° C. or more, using sodium silicate to cause amorphous silica to precipitate on the surface of the particles of carbon black. However none of these publications discloses the deposition of silica on the surface of the carbon black for reinforcing the rubber.

Further, various patents disclose the treatment of carbon black with silicon compounds.

For example, Japanese Unexamined Patent Publication (Kokai) No. 53-100190, Japanese Unexamined Patent Publication (Kokai) No. 56-38357, and Japanese Unexamined Patent Publication (Kokai) No. 61-291659 disclose the mixing and drying of a silicone compound and carbon black.

However, these prior arts do not refer to the superior properties in applications for reinforcement of rubber obtained by the formation of the composites of carbon black and silica.

Further, Japanese Unexamined Patent Publication (Kokai) No. 58-125249 discloses the mixing of carbon black coated with a silane coupling agent on the surface thereof to a thermoplastic resin, but this publication also does not describe anything regarding the superior properties when blending with rubber, in the same way as the above.

Japanese Unexamined Patent Publication (Kokai) No. 4-233976 discloses a process for producing a heated reaction product of a silicon compound having two or less silicone atoms in a molecule with carbon black as a carbon black chemically modified with an organosilicon compound and a rubber composition including the same. This is intended to provide, at the surface of the carbon black, various organic groups through alkoxysilyl groups. The deposition of silica on the surface of the carbon as in the present invention is a fundamentally different technical idea.

DISCLOSURE OF INVENTION

Accordingly, objects of the present invention are to provide a process for producing surface-treated carbon black suitable for reinforcement of a rubber having the superior tan δ temperature dependence possessed by silica and having an excellent wear resistance and electrical conductivity and to provide a rubber composition including the same.

In accordance with the present invention, there is provided a process for producing surface-treated carbon black comprising providing the presence of carbon black and organosiloxane together, then heating the carbon black and the organosiloxane to less than the temperature at which the carbon black is oxidized and to more than the temperature at which the organosiloxane is decomposed or adhered, whereby silicon dioxide residues is deposited on the surface of the carbon black.

BEST MODE FOR CARRYING OUT THE INVENTION

The inventors engaged in intensive studies on a process for production of surface-treated carbon black suitable for use in rubber reinforcement which, as explained above, provides a rubber having the superior tan δ temperature dependency possessed by silica, and having excellent wear resistance, and having no problems derived from a low electrical conductivity. As a result, we discovered that it was possible to produce the desired carbon black by heating carbon black and organosiloxane, together, at a temperature of less than the temperature at which the surface of the carbon black is oxidized (normally less than about 200° C.) and at a temperature of more than the temperature at which the organosiloxane is decomposed or condensed (generally about 60° C. or more), whereby silicon dioxide ($SiO_2$) residues is deposited or adhered on the surface of the carbon black.

The organosiloxane usable as the starting material in the present invention is known in the art. For example, those having the following structure are exemplified.

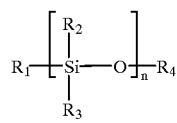

wherein, $R_1$, $R_2$, $R_3$, and $R_4$ are at least one organic group selected from the group consisting of conventionally known organic groups and may be the same or may be all different. Examples of such an organic group are $C_1$ to $C_4$ alkyl groups, $C_1$ to $C_4$ alkoxy groups, and also alkylamino groups (e.g., —RNH$_2$, —RNHR'NH$_2$, —RNH$_2$), epoxy groups (e.g.,

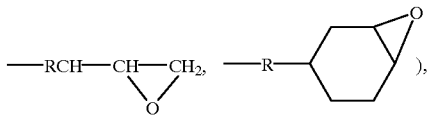

carboxyl groups (e.g., —RCOOH) carbinol groups (e.g., —R' CH), methacrylic acid groups (e.g., —RC (CH$_3$)=CH$_2$), mercapto groups (e.g., —RSH), alkylphenyl groups (e.g.,

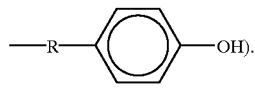

Particularly preferable organosiloxanes are those having in the molecule thereof an alkoxysilyl group-SiOR, wherein R is an alkyl group having 1 to 4 carbon atoms, with each molecule containing at least 3 and not more than 1000, preferably at least 7, more preferably at least 10, silicon atoms. If the number of the silicon atoms is small, the contact thereof with the carbon black and bonding efficiency becomes unpreferably poor. Conversely, if the number of the silicon atom is more than 1000, the viscosity becomes higher, and therefore, the processing becomes difficult. The amount of the organosiloxane added is not particularly limited, but an amount of 0.1 to 50% by weight, in terms of SiO$_2$, based upon the weight of the carbon black is preferable and 0.5 to 30% by weight is more preferable. If the amount used is too small, naturally the desired effects cannot be obtained, while conversely if too large, the electroconductivity is unpreferably decreased.

As the carbon black usable as the starting material in the present invention, it is possible to use any carbon black which is conventionally used in the past for tires and other rubber compositions. Preferable carbon blacks are SRF to SAF grades. It is possible to use the same in various manners or by blending two or more types thereof, depending upon the application of the rubber composition.

A general method for producing the surface-treated carbon black according to the present invention will be explained below.

First, a predetermined amount of the carbon black preferably ungranulated, is measured, followed by adding organosiloxane in an amount corresponding to 0.5 to 50% by weight, in terms of the amount of silica. The mixture is agitated and mixed at an ordinary temperature with a closed type powder mixer, for example, a universal mixer made by Dalton Co. The organosiloxane may be added, after diluting with a suitable solvent in order to facilitate the dispersing thereof. The mixture of organosiloxane and carbon black mixture thus sufficiently agitated is then heated on, for example, a hot plate at a temperature range of 60° C. to 200° C.

The silica surface-treated carbon black for reinforcing rubber according to the present invention can be compounded to any cross-linkable rubber component to obtain a rubber composition having superior wear resistance, grip performance, rolling resistance, etc. Examples of such a cross-linkable rubber are natural rubber (NR), various types of butadiene rubbers (BR), various types of styrene-butadiene copolymers (SBR), polyisoprene rubbers (IR), butyl rubbers (IIR), halogenated butyl rubbers, acrylonitrile-butadiene rubbers, chloroprene rubbers, ethylene-propylene copolymer rubbers, ethylene-propylene-diene copolymer rubbers, styrene-isoprene copolymer rubbers, styrene-isoprene-butadiene copolymer rubbers, isoprene-butadiene copolymer rubbers, chlorosulfonated polyethylene, acryl rubbers, epichlorohydrin rubbers, polysulfide rubbers, silicone rubbers, fluororubbers, urethane rubbers, etc. These may be used alone or in any blend thereof. When using a blend, the ratio of the blend is not particularly limited.

The silica surface-treated carbon black according to the present invention is preferably blended in an amount of 10 to 200 parts by weight of the silica surface-treated carbon black, based upon 100 parts by weight of the rubber component, more preferably 15 to 150 parts by weight. If the amount blended is too small, the rubber cannot be sufficiently reinforced, and therefore, the wear resistance etc. deteriorates. Conversely, if the amount blended is too large, there is the danger of, for example, the hardness becoming too high, and the processability falling, whereby the practical usefulness as a rubber material becomes poor. It is also possible to use in the rubber composition any carbon black and/or silica normally compounded into rubber compositions, in addition to the above surface-treated carbon black.

The above-mentioned rubber composition may also optionally contain, in addition to the above rubber, the carbon black having the silica deposited on the surface thereof, etc., any compounding agent, normally used in the rubber industry, such as sulfur, organic peroxides, softening agents, antioxidants, vulcanization accelerators, fillers, plasticizers, silane coupling agents, etc. in an amount conventionally used.

EXAMPLES

The present invention will now be explained below in further detail with reference to Examples, but it should be noted that the present invention is, of course, not restricted to these examples in scope. Note that the methods of evaluation used in the Examples are as follows:

Methods for Measurement of Properties of Surface-Treated Carbon Black

1) Silica Content

A sample of the surface-treated carbon black was calcified in an electric furnace at 600° C., the ash was subjected to a fluorination treatment, and the reduction in weight was treated as the silica content. This was shown as a percentage by weight based upon the original surface-treated carbon.

2) Nitrogen Specific Area

This was measured according to a method of ASTM D3037.

Methods for Measurement of Physical Properties of Rubber tan δ

This was measured for a sample piece having a width of 5 mm using a viscoelasticity spectrometer made by Toyo Seiki Seisakusho under an amplitude of ±2%, a frequency of 20 Hz, and a static stress of 10%.

REFERENCE EXAMPLES 1 AND 2

Surface-Treated Blacks 1 and 2 according to the present invention were prepared as follows:

Surface-Treated Black 1

100 g of methylethoxy siloxane having a polymerization degree of 40 was added as an organosiloxane to 1 kg of carbon black N339 (Diablack N339 ungranulated, made by Mitsubishi Chemicals), followed by mixing in a universal mixer made by Dalton Co. at ordinary temperature for about 10 minutes. Next, the mixture was uniformly and thinly spread over a hot plate at 180° C. and heat treated for about 6 hours. The surface-treated black obtained after the heating was calcified and the amount of $SiO_2$ measured by the above method was found to be 5.3% by weight.

Surface-Treated Black 2

60 g of silanol-terminal dimethylpolysiloxane (L-9000 (8000): made by Nippon Unicar K.K.) was added as an organosiloxane to 1 kg of carbon black N339 (Diablack N339 ungranulated, made by Mitsubishi Chemicals), followed by treating in the same way as Surface-Treated Black 1 to obtain the surface-treated black. The amount of SiO of the surface-treated black was 3.3% by weight.

EXAMPLES 1 to 4 AND COMPARATIVE EXAMPLES 1 to 4

The components, other than the vulcanization system, in the formulation shown in Table 1 were mixed in an 1.8 liter closed type mixer for 3 to 5 minutes. When reaching the temperature to 165±5° C., the mixture was discharged to obtain a master batch. The master batch was then mixed with the vulcanization accelerator and sulfur with an 8-inch open roll to obtain a rubber composition. The rubber composition obtained was measured for the unvulcanized processability. Next, the composition was press vulcanized in a 15×15×0.2 cm mold at 160° C. for 20 minutes to prepare the desired test piece (rubber sheet), which was then evaluated as to the vulcanized physical properties by the above methods. The results are shown in Table I.

TABLE I

|  | Comparative Example | | | | Example | | | |
| --- | --- | --- | --- | --- | --- | --- | --- | --- |
|  | 1 | 2 | 3 | 4 | 1 | 2 | 3 | 4 |
| SBR1502*[1] | 100.00 | 100.00 | 100.00 | 100.00 | 100.00 | 100.00 | 100.00 | 100.00 |
| Silica*[2] | 40.00 | — | 60.00 | — | — | — | — | — |
| N339*[3] | — | 40.00 | — | 60.00 | — | — | — | — |
| Surface treated black 1*[4] | — | — | — | — | 40.00 | — | 60.00 | — |
| Surface treated black 2*[4] | — | — | — | — | — | 40.00 | — | 60.00 |
| S169*[5] | 4.00 | — | 6.00 | — | 2.00 | 2.00 | 3.00 | 3.00 |
| Diethylene glycol*[6] | 2.00 | — | 3.00 | — | — | — | — | — |
| ZnO | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 |
| Antioxidant*[7] | 2.00 | 2.00 | 2.00 | 2.00 | 2.00 | 2.00 | 2.00 | 2.00 |
| Sulfur | 2.00 | 2.00 | 2.00 | 2.00 | 2.00 | 2.00 | 2.00 | 2.00 |
| Accelerator PG*[8] | 1.00 | — | 1.00 | — | — | — | — | — |
| Accelerator NS*[9] | 0.50 | 1.00 | 0.50 | 1.00 | 1.00 | 1.00 | 1.00 | 1.00 |
| Total (PHR) | 156.50 | 150.00 | 179.50 | 170.00 | 152.00 | 152.00 | 173.00 | 173.00 |
| tanδ (0° C.) | 0.280 | 0.272 | 0.361 | 0.358 | 0.241 | 0.254 | 0.297 | 0.312 |
| tanδ (60° C.) | 0.145 | 0.153 | 0.187 | 0.225 | 0.132 | 0.138 | 0.172 | 0.173 |

Remarks of Table I
*[1]Emulsified polymer SBR made by Nippon Zeon
*[2]Nipsil AQ: Silica made by Nippon Silica Kogyo
*[3]Diablack N339: Carbon black made by Mitsubishi Chemical
*[4]see Reference Examples 1 and 2
*[5]Silane coupling agent (Si69 made by Degussa)
*[6]Diethylene glycol
*[7]Noclac 6C (made by Ouchi Shinko Chemical Industries)
*[8]Nocceler D (made by Ouchi Shinko Chemical Industries)
*[9]Santocure NS (vulcanization accelerator made by Monsanto)

INDUSTRIAL APPLICABILITY

As explained above, according to the present invention, it is possible to provide a rubber composition having both a high wet grip and a low rolling resistance as shown by a high tan δ at 0° C., as an indicator of the wet grip performance and a low tan δ at 60° C., as an indicator of the rolling resistance.

We claim:

1. A rubber composition comprising a cross-linkable rubber and a surface-treated carbon black for rubber reinforcement, wherein said surface-treated carbon black is produced by heating carbon black and organosiloxane together at a temperature of 60° C. to 200° C. to deposit a silicon dioxide residue on the surface of the carbon black.

2. A rubber composition according to claim 1, wherein the organosiloxane comprises an alkyl group bonded directly to silicon, said alkyl group comprising 1 to 4 carbon atoms.

3. A rubber composition according to claim 2, wherein the organosiloxane comprises 3 to 1000 silicon atoms and an alkoxysilyl group.

4. A rubber composition according to claim 3, wherein the amount of organosiloxane is 0.1 to 50% by weight, in terms of $SiO_2$, based upon the weight of the carbon black.

5. A rubber composition according to claim 2, wherein the amount of organosiloxane is 0.1 to 50% by weight, in terms of $SiO_2$, based upon the weight of the carbon black.

6. A rubber composition according to claim 1, wherein the organosiloxane comprises 3 to 1000 silicon atoms and an alkoxysilyl group.

7. A rubber composition according to claim 1, wherein the amount of organosiloxane is 0.1 to 50% by weight, in terms of $SiO_2$, based upon the weight of the carbon black.

* * * * *